(12) United States Patent
Avula et al.

(10) Patent No.: US 10,437,208 B2
(45) Date of Patent: Oct. 8, 2019

(54) SYSTEMS FOR FLEXIBLE AND LOCALIZED ADDITIVE MANUFACTURING

(71) Applicant: DELL PRODUCTS, LP, Round Rock, TX (US)

(72) Inventors: Prasad Avula, Bangalore (IN); Teja Manakame, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 403 days.

(21) Appl. No.: 15/058,775

(22) Filed: Mar. 2, 2016

(65) Prior Publication Data

US 2017/0255171 A1   Sep. 7, 2017

(51) Int. Cl.
| | | |
|---|---|---|
| *G06F 19/00* | (2018.01) | |
| *G05B 15/02* | (2006.01) | |
| *B33Y 50/02* | (2015.01) | |
| *G06Q 10/08* | (2012.01) | |

(52) U.S. Cl.
CPC .............. *G05B 15/02* (2013.01); *B33Y 50/02* (2014.12); *G06Q 10/087* (2013.01)

(58) Field of Classification Search
CPC ....... G05B 15/02; B33Y 50/02; G06Q 10/087
USPC ........................................................ 700/119
See application file for complete search history.

(56) References Cited

U.S. PATENT DOCUMENTS

| | | | |
|---|---|---|---|
| 7,775,355 B1 | 8/2010 | Hood | |
| 2013/0135665 A1* | 5/2013 | Griffith | .................. G06F 3/122 |
| | | | 358/1.15 |
| 2014/0156053 A1 | 6/2014 | Mahdavi et al. | |
| 2015/0321427 A1* | 11/2015 | Gunnarsson | ........... B33Y 50/00 |
| | | | 700/98 |

* cited by examiner

*Primary Examiner* — Tha-O H Bui
(74) *Attorney, Agent, or Firm* — Larson Newman, LLP

(57) ABSTRACT

3D printing via additive manufacturing with 3D printers allows for printing parts of products to customize the products. 3D printing may be used for part design prototyping and verification. Verified 3D part designs may be propagated to 3D printers to allow for distributed 3D printing of parts. 3D printers may be used in production lines to allow for dynamic customization of parts and products. 3D print kiosks may be deployed to allow for localized manufacturing of customized parts and products.

20 Claims, 3 Drawing Sheets

SYSTEMS FOR FLEXIBLE AND LOCALIZED ADDITIVE MANUFACTURING

FIELD OF THE DISCLOSURE

The present disclosure generally relates to additive manufacturing, and more particularly relates to systems utilizing additive manufacturing for flexible and localized part manufacture.

BACKGROUND

Recently additive manufacturing (AM), also known as 3D printing, has been developed to allow for synthesizing three-dimensional objects. The general term 3D printing has thus been used to refer to AM. 3D printers have been developed that print objects via AM by sequentially depositing one or more materials.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
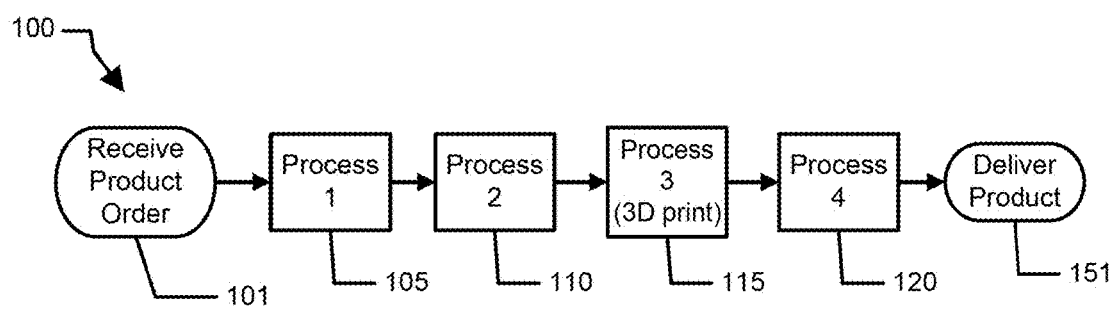
FIG. 1 is an illustration of an embodiment of a production line with additive manufacturing.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

According to embodiments disclosed herein, three dimensional (3D) printing may be used both for prototyping and producing custom objects for customizing products to a user's specification. 3D printing may be implemented at design centers by installing 3D printers at the design centers to allow for product prototyping and verification. Furthermore, the parameters developed for an object with 3D printing may be used with industrial processes to allow for mass-manufacture. With the local 3D printer, the design center may prototype and verify customizable parts.

More particularly, 3D printing at a design center may be used to prototype form and mating changes of a design of an object prior to placing an order for mass quantities of the object under test, thereby reducing the design time cycle of products using 3D printed prototype objects. Furthermore, 3D printing at the design center may be used to validate a 3D design for an object so that the object may readily be produced by 3D printers and used in a device. For example, the mating of the object with an associated device according to the parameters of the design of the object may be tested and the parameters of the design adjusted until an object produced according to the design mates with the associated device as desired.

Subsequent to validation of a 3D design for an object, the 3D design may be used to allow for 3D printing of the object based on the 3D design for the object in a distributed manner. For example, the 3D design may be published on the internet so that the 3D design may be downloaded and provided to a 3D printer to reproduce the object according to the downloaded design. Furthermore, a user may modify the downloaded design as desired to personalize the design before 3D printing an object according to the design such that the object is customized to the user's requirements. For example, an object design may be modified with regard to the size and position of ornaments ornamenting the object, information location, such as serial number, and other modifications to the 3D design to produce a customized object with may be used as a component of a device.

AM may be used in production lines to manufacture objects, such as parts, for products, to increase the flexibility of product manufacture and allow for dynamic product customization. 3D printers integrated into a production line may allow for dynamically printing customized parts for a product, based on, for example, product or order number associated with the particular product or a set of products being manufactured. For example, 3D printers in a production line can be used to print customized faceplates for products such as laptop computers, tablets, and communication devices based on order details and configuration options presented to and selected by a user with regard to decoration of the faceplate so that the user may have a unique customized faceplate for the user's product. Individual units may be customized or sets of units may be customized.

Furthermore, using 3D printers in a production line enables the manufacturer to dynamically print parts for a product with unique information hard-printed into the part. For example, a part may be printed with regulatory, security, or service information in three dimensions, referred to as hard-printing. In an embodiment of this example, a set of regulatory, security, or service information may be developed for a set of parts to be printed via AM. The set of information may be modified for each individual part of the set of parts, such that the information hard-printed to individual parts of the set of parts is unique. For example different individual parts may be hard-printed with different individual serial numbers, or service information. In addition, the set of information may be varied according to different input parameters associated with the information which may be provided by a user.

3D printers may also be integrated into a production line to provide dynamic part or product material variation. That is, the material composition of a part or product may be dynamically varied by using different 3D printers configured to print objects with different material compositions or configuring a 3D printer to print according to different material compositions.

FIG. 1 shows an embodiment of a production line 100 with integrated AM. At 101, the production line receives a product order. The product order may include unique information defining a unique product. At 105, a production line process 1 is performed based upon the product order. Process 1 may produce one or more elements, such as parts, of the product and compile, for example, assemble the same to produce a partially completed product according to the product order. At 110, process 2 is performed with regard to the partially completed product according to the product order. Process 2 may involve further completing the partially completed product with more parts or processing. For example, process 1 could involve producing parts for a product and process 2 may involve assembling said parts, for example, by welding or soldering.

In production line 100, at 115, the partially completed product is further completed via process 3. Process 3 is an AM process involving 3D printing a part for the partially completed product. 3D printing a part according to process 3 may comprise dynamically printing a custom part based upon an order, serial, or production number associated with the product. Still further, a set of parts may be 3D printed for a set of products and used in the set of products. The 3D printing process may be varied for individual products such that individual products may have parts with different properties. For example, the properties of a part in a product may be varied by using different 3D printers to print the part for individual products or sets of products, or the material composition of the printing may be changed to produce parts with different properties.

In an example embodiment, a faceplate part for a laptop computer may be produced with varying concentrations of aluminum for durability based upon an order number. In production line 100, at 115, there may be different 3D printers configured to print a faceplate design according to different respective resiliences. When a partially completed product and associated order number is received at 115, a particular 3D printer may be selected to print the faceplate based on the order number. The order number may indicate a future use of the product, for example office or outdoor use. In a further example, a 3D printer may be configured to print the faceplate according to particular material parameters by adjusting the material composition of the printing material used by the 3D printer. The material composition may be adjusted based on order number or other product parameter indicating a likely future use of the product comprising the faceplate.

At 115, the 3D printed part is used to further complete the partially completed product such that the partially completed product includes the 3D printed part. At 120, a production line process 4 is performed based upon the product order. Process 4 may produce one or more elements, such as parts, of the product and compile, for example, assemble the same. Process 4 may complete the partially completed product according to the product order. Then at 151, the completed product is delivered from production line 100.

As would be understood by one of skill in the art, each of processes 1-4 may subsume multiple processes. Furthermore, process 3 may include operation of one or more AM apparatuses.

Figure 2:
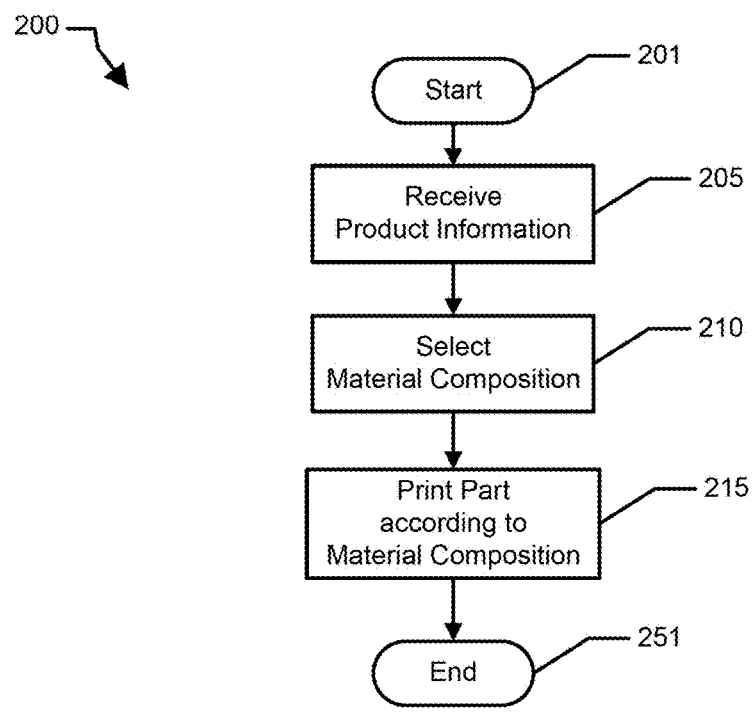
FIG. 2 is a flow chart of an example method of producing objects via additive manufacturing.

FIG. 2 shows a portion 200 of an embodiment of process 3 of production line 100. At 201, portion 200 begins. At 205, product information is received. Product information may be a serial number, an order number, or other information, such as a desired property of a product or a part of the product. At 210, a material composition is selected for a part of the product based upon the product information. For example, the part could be a laptop computer cover, and the product information could be information indicating a desired resilience or other property of the cover to provide a desired robustness of the laptop computer. At 215, the part is 3D printed according to the selected material composition. In a production line or other production facility, this may involve selecting a 3D printer configured to print according to the selected material composition, or configuring a 3D printer in the production facility to print the part according to the selected material composition. At 251, portion 200 ends. As would be understood by one of skill in the art, portion 200 may be repeated for different parts or sets of parts with different selected material compositions to allow for dynamic customization of products in production line 100. AM may also be implemented via 3D print kiosks to allow for localized part customization and production.

Figure 3:
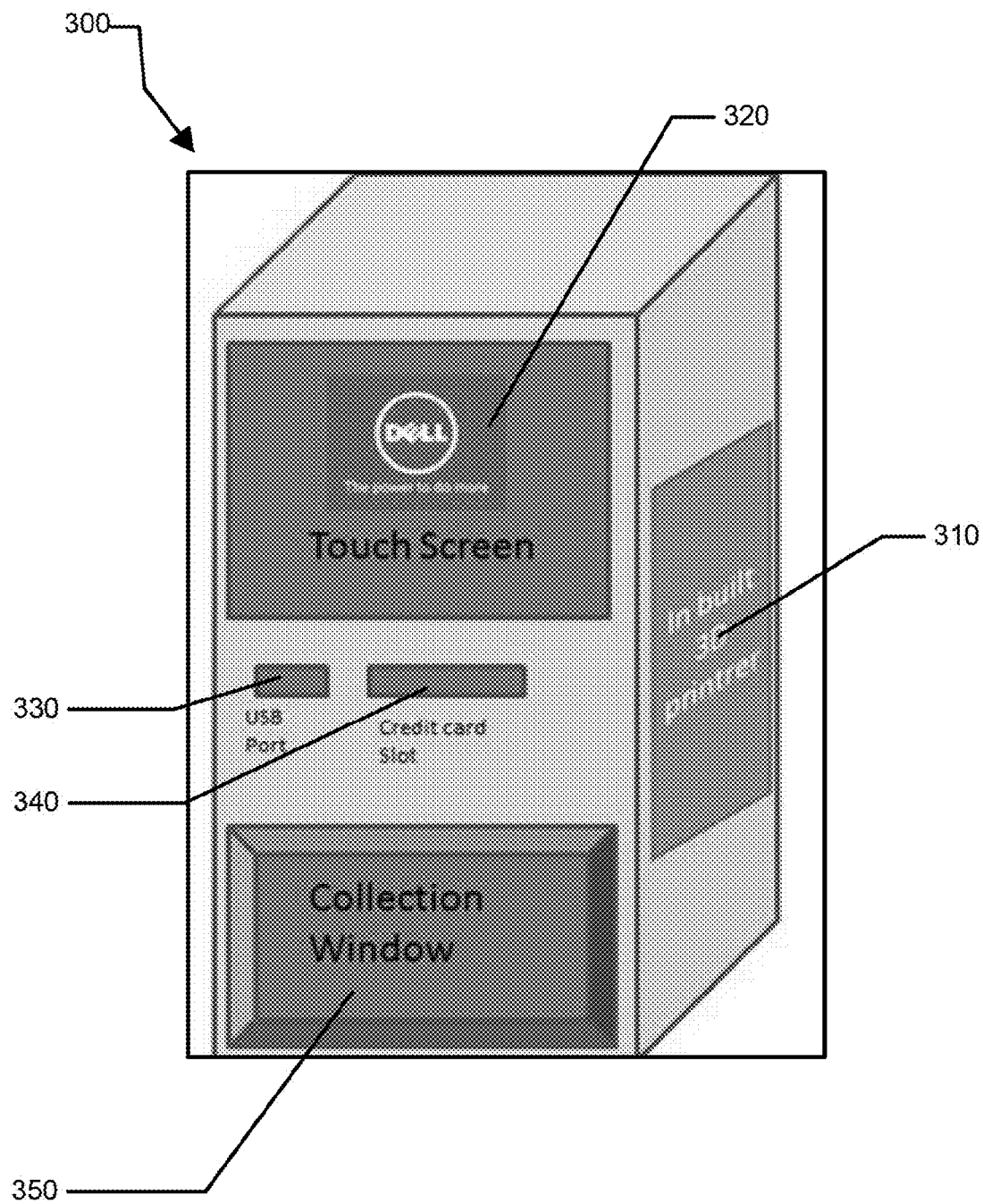
FIG. 3 is an illustration of an embodiment of a three dimensional print kiosk.

FIG. 3 shows a modular 3D print kiosk 300. 3D print kiosk 300 comprises a built in 3D printer 310 encapsulated by print kiosk 300, a touch screen 320, a Universal Serial Bus (USB) port 330, a credit card slot 340, and a collection window 350.

In operation, a user using 3D print kiosk 300 may select a part to print from a pre-existing catalog of parts for a product provided to the user via touch screen 320 using touch screen 320. The user may customize the part via touch screen 320, by, for example, selecting a desired material composition or other parameters of the part. The user may also customize the part by providing customization information to kiosk 300 via USB 330. For example, a user may upload graphics or other customization information to kiosk 300 via USB port 330 to be used to 3D print the selected part. The user may purchase the selected and customized part via credit cart slot 340. The part will then be printed with 3D printer 310 according to the provided customization information and, when printing is complete, the purchased part will be deposited in collection window 350 for collection by the user. Collection window 350 may be a secure collection window requiring the user to enter security information before the collection window will open to allow the user to collect the part.

3D print kiosk 300 or other 3D print kiosk may be located at local stores or other locations to allow for localized part customization and production. 3D print kiosk 300 is described by way of explanation and not limitation: embodiments of 3D print kiosks may be accessed over a telecommunications network such as the internet to allow for a user to interface with the print kiosk. For example, instead of using touch screen 320 to select a part, a user may select a part over the internet and designate a local 3D print kiosk to print the selected part. Furthermore, the user may send customization information to the selected local 3D print kiosk over the internet, and may also pay for the selected and customized part over the internet. Then the user may go to the selected local print kiosk and pick up the product from a collection window using security information provided over the internet to access the collection window.

Figure 4:
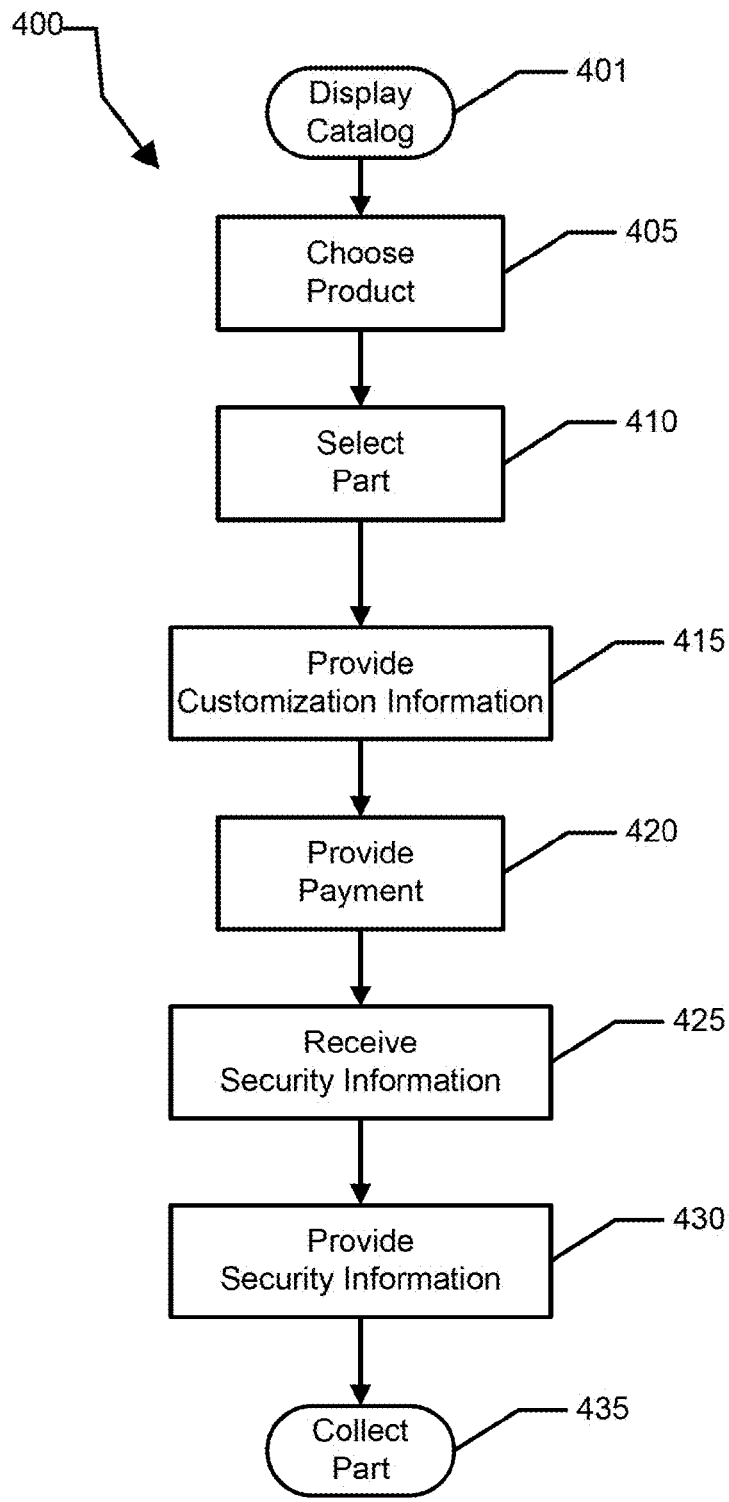
FIG. 4 is a flow chart of an example method of localized part manufacture via additive manufacturing.

FIG. 4 shows a method 400 for implementing localized part customization and production using a 3D print kiosk such as 3D print kiosk 300 of FIG. 3. At 401 the method begins, and a catalog is provided to a user via a display. At 405 the user chooses a product from the catalog. At 410 the user selects a part of the product to be produced and purchased. At 415 the user provides customization information for the part. For example, as described above, such information may be material composition, desired properties of the part, or graphics to be integrated into the part. At 420, the user provides payment for the selected part to be produced to the customization information. The 3D print kiosk may begin to print the selected part according to the customization information. At 425, the user receives security information such as a username and password to be used to access the part at the 3D print kiosk. The user goes to the physical location of the selected print kiosk. At 430 the user provides the received security information to the print kiosk. In response, the print kiosk may deposit the purchased part in a collection window or may indicate that more time is needed to complete printing the purchased part, for example on a display. At 435 the user collects the purchased part, for example, from the collection window and method 400 ends.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

When referred to as a "device," a "module," or the like, the embodiments described herein can be configured as hardware. For example, a portion of a system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A three-dimensional (3D) print kiosk comprising:
a credit card slot;
a 3D printer encapsulated by the 3D print kiosk; and
a secure collection window coupled to receive output from the 3D printer, the secure collection window configured to open to permit access to the output from the 3D printer to a user in response to security information received from the user, the 3D print kiosk configured to:
receive a part selection for a part associated with a product;
receive a payment for the part via the credit card slot;
receive customization information from the user, wherein the customization information defines a parameter of the part;
select a material composition for the part based upon the received customization information;
provide the security information to the user;
print the part via addictive manufacturing according to the received customization information according to the material composition;
receive the security information from the user; and
provide the printed part to the user via the collection window.

2. The 3D print kiosk of claim 1, wherein the security information includes a name or password.

3. The 3D print kiosk of claim 1, further comprising a display, wherein a catalog including the product is displayed to the user with the display, and wherein the 3D print kiosk is further configured to receive a selection of the product from the catalog.

4. The 3D print kiosk of claim 3, wherein the 3D print kiosk is further configured to display a list of parts associated with the selected product on the display for selection, the list of parts including the part.

5. The 3D print kiosk of claim 1, further comprising a port configured to receive the customization information.

6. The 3D print kiosk of claim 1, wherein the customization parameters includes an indication of a desired durability of a material of the part.

7. The 3D print kiosk of claim 1, wherein the customization parameter include a graphic.

8. The 3D print kiosk of claim 1, further comprising a payment mechanism, wherein the 3D print kiosk is further configured to provide the security information to the user subsequent to a payment using the payment mechanism.

9. The 3D print kiosk of claim 1, wherein the 3D print kiosk is coupled to a telecommunications network.

10. The 3D print kiosk of claim 9, wherein the 3D print kiosk receives the part selection over the telecommunications network.

11. The 3D print kiosk of claim 9, wherein the 3D print kiosk receives the customization information over the telecommunications network.

12. The 3D print kiosk of claim 9, wherein the 3D print kiosk provides the security information to the user over the telecommunications network.

13. The 3D print kiosk of claim 9, wherein the 3D print kiosk provides a print complete indication to the user over the telecommunications network, wherein the print complete indication indicates the part may be collected via the collection window.

14. A method, comprising:
receiving, at a display of a 3D print kiosk, a part selection for a part associated with a product;
receiving, by a credit card slot of the 3D print kiosk, a payment for the part;
receiving, by the 3D print kiosk, customization information from a user, wherein the customization information defines a parameter of the part;
selecting, by the 3D print kiosk, a material composition for the part based upon the received customization information;
providing, by the 3D print kiosk, security information to the user;
printing, by the 3D print kiosk, the part via addictive manufacturing according to the received customization information and according to the material composition;

receiving, by the 3D print kiosk, the security information from the user; and providing, at a secure collection window of the 3D kiosk, the printed part to the user, the secure collection window configured to open to permit access to the part to the user in response to receiving the security information from the user.

15. The method of claim 14, wherein the security information includes a name or password.

16. The method of claim 15, further comprising:
displaying a list of parts associated with the selected product for selection, the list of parts including the part.

17. The method of claim 14, further comprising:
displaying, by the display, a catalog including the product to the user; and
receiving a selection of the product from the catalog.

18. The method of claim 14, further comprising:
receiving, by a port of the 3D print kiosk, the customization information.

19. The method of claim 14, wherein the customization parameters includes an indication of a desired durability of a material of the part.

20. A three-dimensional (3D) print kiosk comprising:
a display;
a universal serial bus port;
a credit card slot;
a 3D printer encapsulated by the 3D print kiosk; and
a secure collection window coupled to receive output from the 3D printer, the secure collection window configured to open to permit access to the output from the 3D printer to a user in response to security information received from the user, the 3D print kiosk configured to:
receive a part selection for a part associated with a product via the display;
receive a payment for the part via the credit card slot;
receive customization information from the user via the universal serial bus port, wherein the customization information defines a parameter of the part;
select a material composition for the part based upon the received customization information;
provide the security information to the user;
print the part via addictive manufacturing according to the received customization information and according to the material composition;
receive the security information from the user; and
provide the printed part to the user via the collection window.

* * * * *